United States Patent [19]

Fargier

[11] Patent Number: 4,809,823
[45] Date of Patent: Mar. 7, 1989

[54] BRAKING DEVICE FOR A VEHICLE

[75] Inventor: Eric Fargier, Neuilly-Plaisance, France

[73] Assignee: Bendix France, Drancy, France

[21] Appl. No.: 235,822

[22] Filed: Aug. 19, 1988

Related U.S. Application Data

[63] Continuation of Ser. No. 111,943, Oct. 21, 1987, abandoned.

[30] Foreign Application Priority Data

Oct. 31, 1986 [FR] France ............................ 86 15195

[51] Int. Cl.$^4$ ............................................. F16D 55/22
[52] U.S. Cl. .................................. 188/72.7; 188/180;
188/184; 188/185; 188/343; 192/103 A;
192/103 B
[58] Field of Search ...................... 188/72.7, 162, 180,
188/184, 185, 187, 343; 192/103 A, 103 B, 105
A, 105 AB, 105 B

[56] References Cited

U.S. PATENT DOCUMENTS

| 558,844 | 4/1896 | Robinson | 188/187 |
|---|---|---|---|
| 1,720,766 | 7/1929 | Spahr | 188/187 |
| 2,226,188 | 12/1940 | Wittel | 188/187 |
| 2,375,639 | 5/1945 | Falk | 188/187 |
| 2,496,201 | 1/1950 | Dodge | 192/105 B X |
| 2,954,674 | 10/1960 | Kane | 192/105 A X |
| 4,064,973 | 12/1977 | Deem et al. | 188/71.7 |
| 4,235,312 | 11/1980 | Garrett et al. | 188/343 X |

FOREIGN PATENT DOCUMENTS

| 784779 | 7/1935 | France . |  |
| 802317 | 9/1936 | France . |  |
| 973544 | 2/1951 | France . |  |
| 2557528 | 7/1985 | France . |  |
| 182113 | 4/1936 | Switzerland | 188/187 |

Primary Examiner—George E. A. Halvosa
Attorney, Agent, or Firm—Larry J. Palguta; Ken C. Decker

[57] ABSTRACT

Braking device for a vehicle, comprising a mechanism for driving at least one friction member in frictional engagement with a rotary member to be braked, the mechanism comprising a wedge (28) movable in a first axis in order to shift an actuating member (14) of the brake under the effect of a force coming from an actuator (34), characterized in that the actuator (34) comprises a centrifugal assembly (34) equipped with at least two flyweights (40; 72) arranged about a second axis and intended for rotating selectively about this second axis, the rotation of the flyweights (40; 72) about the second axis causing them to move away from the latter, and a connecting assembly (36, 30; 76, 90) between the flyweights (40; 72) and the wedge (28) for converting the movement away of the flyweights (40; 72) into a movement of the wedge (28) in the first axis.

10 Claims, 3 Drawing Sheets

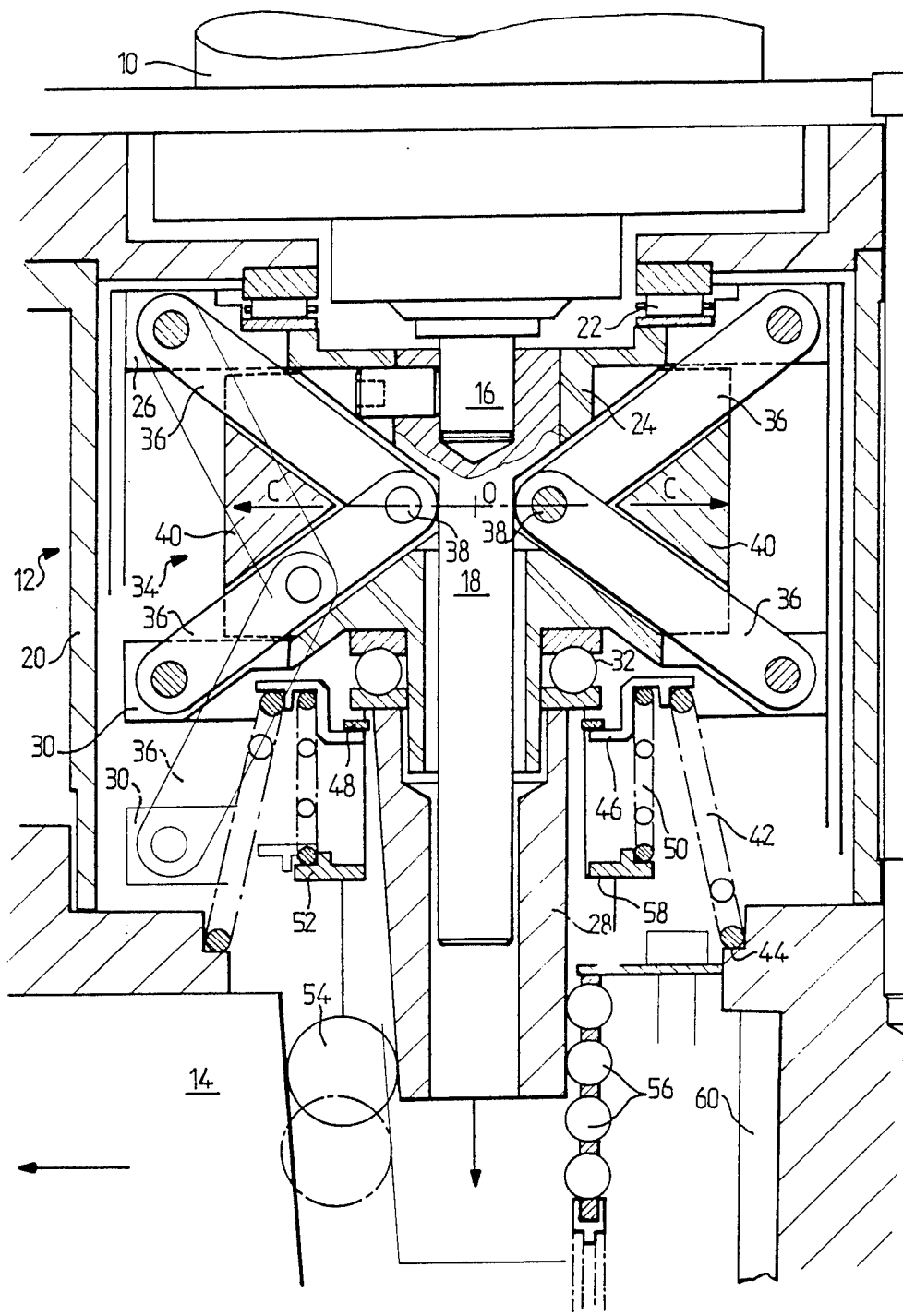
FIG_1

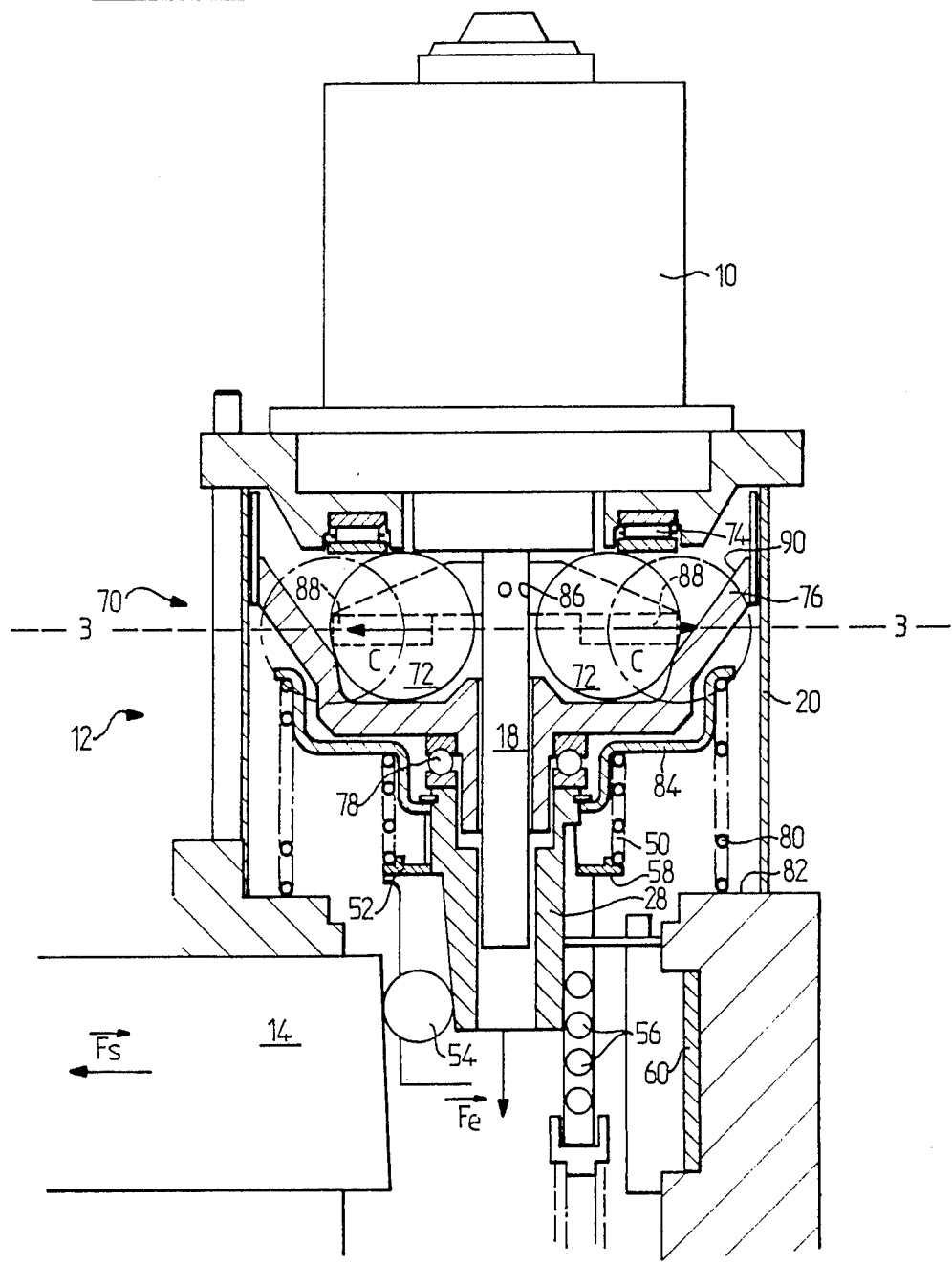
FIG_2

FIG_3
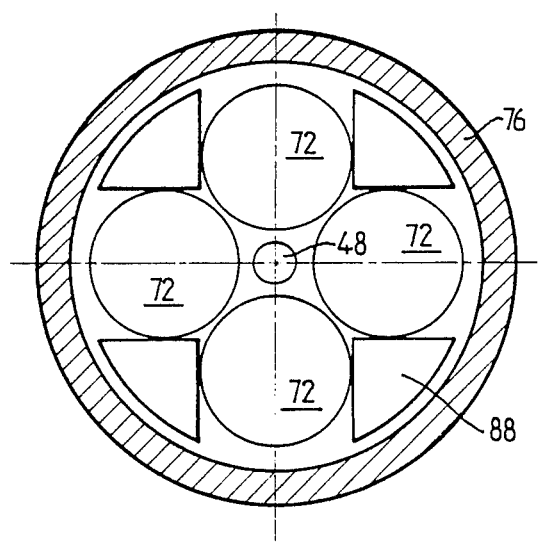

BRAKING DEVICE FOR A VEHICLE

This is a continuation of application Ser. No. 111,943, filed Oct. 21, 1987.

The present invention relates to braking devices for vehicles, of the type comprising a mechanism for driving at least one friction member in frictional engagement with a rotary member to be braked, the mechanism comprising a wedge movable in a first axis in order to shift an actuating member of the brake under the effect of a force coming from an actuator.

A braking device of this type is described in the document U.S. Pat. No. 4,064,973. In this document, the actuating device comprises a pneumatic piston connected to the wedge. This device has disadvantages in that it does not allow easy adjustment of the braking force, as required in an anti-skid braking system.

It is therefore an object of the invention to provide a braking device which is of simple and robust construction and the braking force of which can be adjusted easily.

According to the present invention, the actuator comprises a centrifugal assembly equipped with at least two flyweights arranged about a second axis and intended for rotating selectively about this second axis, the rotation of the flyweights about the second axis accusing them to move away from the latter, and a connecting assembly between the flyweights and the wedge for converting the movement away of the flyweights into a movement of the wedge in the said first axis.

The invention will now be described by way of example with reference to the accompanying drawings in which:

FIG. 1 is a view in longitudial section of a braking device with actuation by centrifugal force according to a first embodiment of the invention;

FIG. 2 is a view in partial section of a second embodiment of the device according to the present invention; and FIG. 3 is a view in partial section taken along the line 3—3 of FIG. 2.

As illustrated in FIG. 1, a braking device comprises an electric motor 10, an actuator designated as a whole by the reference 12, and a disc brake, of which only an actuating piston 14 is shown in the Figure. The disc brake is of a type known per se, controlled by means of a wedge. An example of this type of brake is given in the document U.S. Pat. No. 4,064,973, the content of which is assumed to be incorporated herein for reference.

The electric motor 10 has an output shaft 16 connected coaxially to a shaft 18 of the actuator 12. The actuator 12 comprises a housing 20 in which a roller bearing 22 is mounted at an end adjacent to the electric motor 10. The shaft 18 is mounted rotatably in the housing 20 by means of a collar 24 which is fitted on the roller bearing 22. A first annular support 26 fastened to the collar 24 is likewise fitted on the roller bearing 22.

A wedge 28 is mounted round the free end of the shaft 18 of the actuator 12, and it is intended to actuate the disc brake by means of the actuating piston 14, as described below. The wedge 28 is free to slide axially relative to the shaft 18, but cannot rotate relative to this. A second substantially annular support 30 is mounted rotatably on the wedge 28 by means of a ball bearing 32. Grooves 33 are advantageously made in a second support 30 and the shaft 18.

According to the invention, the actuator comprises a centrifugal device, designated as a whole by the reference 34, which comprises several pairs of links 36, two pairs in the example illustrated, which are mounted pivotably on an axle 38 in such a way that the two links 36 remain in the same plane. The free end of the link 36 of each pair is mounted pivotably on an associated annular support 26, 30. The two annular supports 26, 30 are thus maintained integral with one another in terms of rotation about the shaft 18, but they can move away from one another in the axis of this shaft. A flyweight 40 is mounted pivotably on the axle 38 of each pair of links 36, in such a way that its center of gravity is located in the drawing plane. The two flyweights 40 are arranged symmetrically relative to the axis of the shaft 18.

The centrifugal actuating device 34 is pushed towards its position of rest illustrated by a spring 42, one end of which is mounted on a radial shoulder 44 of the housing 20. The other end of the spring 42 bears on a stepped ring 46 which is retained on the wedge 28 by means of a circlip. A second spring 50 is retained between the stepped ring 46 and one end of a roller cage 52 which is mounted freely round the wedge 28 in a known way. The roller cage 52 receives an actuating roller 54 which, during the movement of the wedge 28, transmits the force of the latter to the actuating piston 14 of the brake, as is known to a person skilled in the art. The case 52 also receives a set of rollers 56 which allows the wedge 28 to move in the axis of the shaft 18. In the position of rest of the device, as illustrated, the end of the cage 52 is up against a radial shoulder 58 of the wedge 28, under the effect of the spring 50.

A pressure sensor 60 which, in the example illustrated, is a piezoelectric sensor is mounted between the raceway of the rollers 56 and the housing 20 of the device.

The mode of operation of the device will now be described. When the vehicle driver presses on the brake pedal, an electrical current of an intensity dependent on the position of the pedal is fed to the electric motor 10. The motor 10 starts to rotate in order to drive the shaft 18, the two annular supports 26, 30 and the flyweights 40 in rotation. A centrifugal force then acts on the flyweights 40 in the direction of the arrows C and tends to move these flyweights away from the axis of the shaft. The movement away of the flyweights 40 shifts the links 36 which open and tend to assume the position represented by broken lines in FIG. 1. This movement away of the flyweights 40 and opening of the links 36 cause the second annular support 30 and therefore the wedge 28 to move downwards, as seen in the drawing. The movement of the wedge 28 causes the movement of the rollers 54 and 56 and of the actuating piston 14 of the brake in a way known per se, the spring 50 allowing a relative movement between the wedge 28 and the cage 52.

The pressure sensor 60, as a result of reaction, detects the force exerted by the actuating piston 14 on the friction members (not shown) of the brake, thus making accurate control of the motor 10 possible. Electrical signals coming from the pressure sensor 60 are transmitted to an electronic control unit (not shown) which also receives signals from, for example, a position sensor associated wtih the brake pedal (not shown), in order to generate the control signal of the electric motor 10.

When the motor 10 slows down, the centrifugal activating device 34 tends to resume its position of rest under the effect of the spring 42, thus causing the brake to be released. It is therefore possible to adjust the braking force by adjusting the rotational speed of the motor.

The braking device illustrated in FIGS. 2 and 3 differs from that of FIG. 1 in the structure of the centrifugal actuating device. The device for actuating the brake, comprising the wedge 28, the roller cage 52, 54, 56 and the actuating piston 14, will not be described again.

In this second embodiment, the centrifugal actuating device, designated as a whole by the reference 70, comprises several metal balls 72, in the example illustrated four balls, arranged symmetrically round the shaft 18. The balls 70 are confined between a needle bearing 74 fastened to the housing 20 and a substantially cup-shaped support 76. The support 76 is mounted rotatably relative to the wedge 28 by means of a ball bearing 78 and can slide axially relative to the shaft 18, counter to a spring 80 mounted between an inner surface of the housing 20 and a stepped ring 84 integral with the wedge 28. A cross-shaped support 86 integral with the shaft 18 has four projections 88 of substantially triangular cross-section, which retain the four balls 72 in their spaced positions and which drive them in rotation with the shaft 18.

The mode of operation of this device is similar to that of the device of FIG. 1. During braking, as described above, the motor 10 starts to rotate and by means of the projections 88 drives the balls 72 and the support 76 in rotation about the axis of the shaft which rotates together with the balls, in order to reduce the friction. A centrifugal force acts on the balls 72 in the direction of the arrows C and tends to move them away from the axis. The balls 72, by moving away towards their positions represented by broken lines, act on a conical inner surface 90 of the support 76 and move the latter downwards, as seen in the drawing. The movement of the support 76 causes the movement of the wedge 28 and of the actuating piston 14 in a similar way to that seen in the first embodiment.

This device likewise has a force sensor 60 which, as in the first embodiment, makes it possible to adjust the braking accurately, the balls 72 resuming their positions of rest, represented by unbroken lines, under the effect of the spring 80 when the motor 10 slows down.

I claim:

1. A braking device for a vehicle, comprising a mechanism for driving at least one friction member into frictional engagement with a rotary member to be braked, the mechanism comprising a wedge movable along a first axis in order to shift an actuating member of the brake under the effect of a force coming from motor means and an actuator, characterized in that the actuator comprises a centrifugal assembly equipped with at least two flyweights arranged about a second axis and intended for rotating selectively about the second axis, the rotation of the flyweights about the second axis causing the flyweights to move away from the second axis, and a connecting assembly between the flyweights and the wedge for converting the movement of the flyweights away from the second axis into a movement of the wedge along the first axis, the device including a pressure sensor which, as a result of a reaction force, detects a force exerted by the actuating member on the one friction member, and a control unit connected with the pressure sensor, the sensor communicating with the control unit and the control unit transmitting control signals to the motor means whereby the speed of rotation of the flyweights is varied accordingly by the control unit.

2. The device according to claim 1, characterized in that the centrifugal assembly comprises two flyweights each arranged on an assembly of links forming part of the connecting assembly.

3. The device according to claim 2, characterized in that the connecting assembly comprises a first and a second support arranged to be rotatable about the second axis and maintained integral with one another in terms of rotation by means of the assembly of links, but capable of moving away from one another in order to move the wedge.

4. The device according to claim 3, characterized in that the assembly of links comprises two pairs of links, each pair being associated with a flyweight, one end of each link being mounted pivotably on one of the supports, and each pair of links being connected together by means of an axle, the flyweight associated with each pair of links being mounted pivotably on the axle.

5. The device according to claim 4, characterized in that one of the supports is mounted rotatably on the wedge.

6. The device according to claim 1, characterized in that the connecting assembly comprises a first and a second support, the second support having a cam surface and being arranged so as to be rotatable about the second axis, the flyweights being arranged between the first and the second support in such a way that the movement of the flyweights away from the second axis acts on the cam surface and causes the supports to move away from one another.

7. The device according to claim 6, characterized in that the flyweights comprise four balls arranged symmetrically about the second axis.

8. The device according to claim 6, characterized in that the first support is fixed relative to the second axis, the second support being mounted rotatably on the wedge and being free to move along the second axis.

9. The device according to claim 8, characterized in that the first and second axes are coaxial.

10. The device according to claim 9, characterized in that the device is intended for actuating a disc brake.

* * * * *